United States Patent
Alfano et al.

(10) Patent No.: US 11,086,415 B1
(45) Date of Patent: Aug. 10, 2021

(54) HAPTIC PEN FOR AN INFORMATION HANDLING SYSTEM

(71) Applicant: Dell Products L.P., Round Rock, TX (US)

(72) Inventors: Keith M. Alfano, Austin, TX (US); Michael S. Gatson, Austin, TX (US); Thomas Lanzoni, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/751,365

(22) Filed: Jan. 24, 2020

(51) Int. Cl.
*G06F 3/0354* (2013.01)
*G06F 3/0346* (2013.01)
*G06F 3/01* (2006.01)

(52) U.S. Cl.
CPC .......... *G06F 3/03545* (2013.01); *G06F 3/016* (2013.01); *G06F 3/0346* (2013.01)

(58) Field of Classification Search
CPC ... G06F 3/03545; G06F 3/016; G06F 3/04162
See application file for complete search history.

(56) References Cited

U.S. PATENT DOCUMENTS

| | | | | |
|---|---|---|---|---|
| 5,717,168 A * | 2/1998 | DeBuisser | .......... | G06F 3/03545 |
| | | | | 178/18.04 |
| 9,524,624 B2 * | 12/2016 | Rank | ...................... | G06F 3/0488 |
| 1,050,946 A1 | 12/2019 | Kuchenbecker et al. | | |
| 2010/0127581 A1 * | 5/2010 | Yun | ........................ | B06B 1/045 |
| | | | | 310/25 |
| 2015/0277596 A1 * | 10/2015 | Hoffman | ................. | G06F 3/016 |
| | | | | 345/179 |
| 2016/0267319 A1 * | 9/2016 | Murillo | .............. | G06K 9/00604 |
| 2017/0212589 A1 | 7/2017 | Domenikos et al. | | |
| 2019/0171291 A1 | 6/2019 | Domenikos et al. | | |

OTHER PUBLICATIONS

Culbertson, H., & Kuchenbecker, K. J. (2016). Importance of matching physical friction, hardness, and texture in creating realistic haptic virtual surfaces. IEEE Transactions on Haptics, 10(1), 63-74, 2016.
Culbertson, H., Unwin, J., & Kuchenbecker, K. J. (2014). Modeling and rendering realistic textures from unconstrained tool-surface interactions. *IEEE transactions on haptics*, 7(3), 381-393, 2014.
Romano, J. M., & Kuchenbecker, K. J. (2011). Creating realistic virtual textures from contact acceleration data. IEEE Transactions on haptics, 5(2), 109-119, 2011.

* cited by examiner

*Primary Examiner* — Laurence J Lee
(74) *Attorney, Agent, or Firm* — Baker Botts L.L.P.

(57) ABSTRACT

A method for emulating writing devices using a haptic pen is disclosed herein. The method may include receiving, by a first microcontroller unit of the haptic pen, a device configuration indicating a writing device to be emulated. The first microcontroller unit may cause transmitters of the haptic pen to transmit a beacon to a second microcontroller unit of a display. The first microcontroller unit may receive contextual inputs from the second microcontroller unit that indicate an orientation of the haptic pen in relation to the display. The first microcontroller unit may apply a respective weight to each of the contextual inputs based on the device configuration and may cause a haptic response based on the respective weights applied to each of the contextual inputs. The haptic response causes the haptic pen to emulate the writing device.

17 Claims, 4 Drawing Sheets

HAPTIC PEN FOR AN INFORMATION HANDLING SYSTEM

BACKGROUND

Field of the Disclosure

The disclosure relates generally to information handling systems, and in particular to a system and method for managing a flow state of a user of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed method for emulating a plurality of writing devices using a haptic pen for an information handling system may include: receiving, by a first microcontroller unit of the haptic pen, a device configuration indicating at least one writing device of the plurality of writing devices to be emulated; causing, by the first microcontroller unit, one or more transmitters of the haptic pen to transmit a beacon to a second microcontroller unit of a display of the information handling system; receiving, by the first microcontroller unit, one or more contextual inputs from a second microcontroller of the display of information handling system, the one or more contextual inputs indicating an orientation of the haptic pen in relation to a display of the information handling system; applying, by the first microcontroller unit, a respective weight to each of the one or more contextual inputs based on the device configuration; and causing, by the first microcontroller unit, a haptic response based on the respective weight applied to each of the one or more contextual inputs, the haptic response causing the haptic pen to emulate the at least one writing device of the plurality of writing devices.

In one or more of the disclosed embodiments, causing the haptic response based on the respective weight applied to each of the one or more contextual inputs includes: causing, by the first microcontroller unit, one or more haptic motors of the haptic pen to vibrate according to the respective weight applied to each of the one or more contextual inputs.

In one or more of the disclosed embodiments, causing the haptic response based on the respective weight applied to each of the one or more contextual inputs further includes: causing, by the second microcontroller unit, an inking layer of the display of the information handling system to display a digital representation of writing associated with the at least one writing device, the digital representation emulating a writing style of the at least one writing device.

In one or more of the disclosed embodiments, the method further includes: receiving, by the first microcontroller unit, a texture configuration indicating at least one textured item of a plurality of textured items to be emulated; applying, by the first microcontroller unit, the respective weight to each of the one or more contextual inputs based on the texture configuration; and causing, by the first microcontroller unit, the haptic response based on the respective weight applied to each of the one or more contextual inputs, the haptic response causing the haptic pen to emulate the at least one textured item of the plurality of textured items.

In one or more of the disclosed embodiments, the method further includes: determining, by the second microcontroller unit, the one or more contextual inputs based on the beacon, wherein the one or more contextual inputs include a tilt angle of the haptic pen in relation to a surface of the display; and transmitting, by the second microcontroller unit, the one or more contextual inputs to the first microcontroller unit of the haptic pen.

In one or more of the disclosed embodiments, the method further includes: determining, by the second microcontroller unit, the one or more contextual inputs based on the beacon, wherein the one or more contextual inputs include a barrel rotation of the haptic pen about an axis of the haptic pen; and transmitting, by the second microcontroller unit, the one or more contextual inputs to the first microcontroller unit of the haptic pen.

In one or more of the disclosed embodiments, the method further includes: determining, by the second microcontroller unit, the one or more contextual inputs based on the beacon, wherein the one or more contextual inputs include a velocity of the haptic pen; and transmitting, by the second microcontroller unit, the one or more contextual inputs to the first microcontroller unit of the haptic pen.

In one or more of the disclosed embodiments, the method further includes: determining, by the second microcontroller unit, the one or more contextual inputs based on the beacon, wherein the one or more contextual inputs include a position of the haptic pen in relation to a surface of the display; and transmitting, by the second microcontroller unit, the one or more contextual inputs to the first microcontroller unit of the haptic pen.

In one or more of the disclosed embodiments, the method further includes: determining, by the first microcontroller unit, the one or more contextual inputs based on a pressure sensor of the haptic pen, wherein the one or more contextual inputs include a pressure with which a user is using the haptic pen, the pressure sensor disposed proximate to a tip of the haptic pen.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
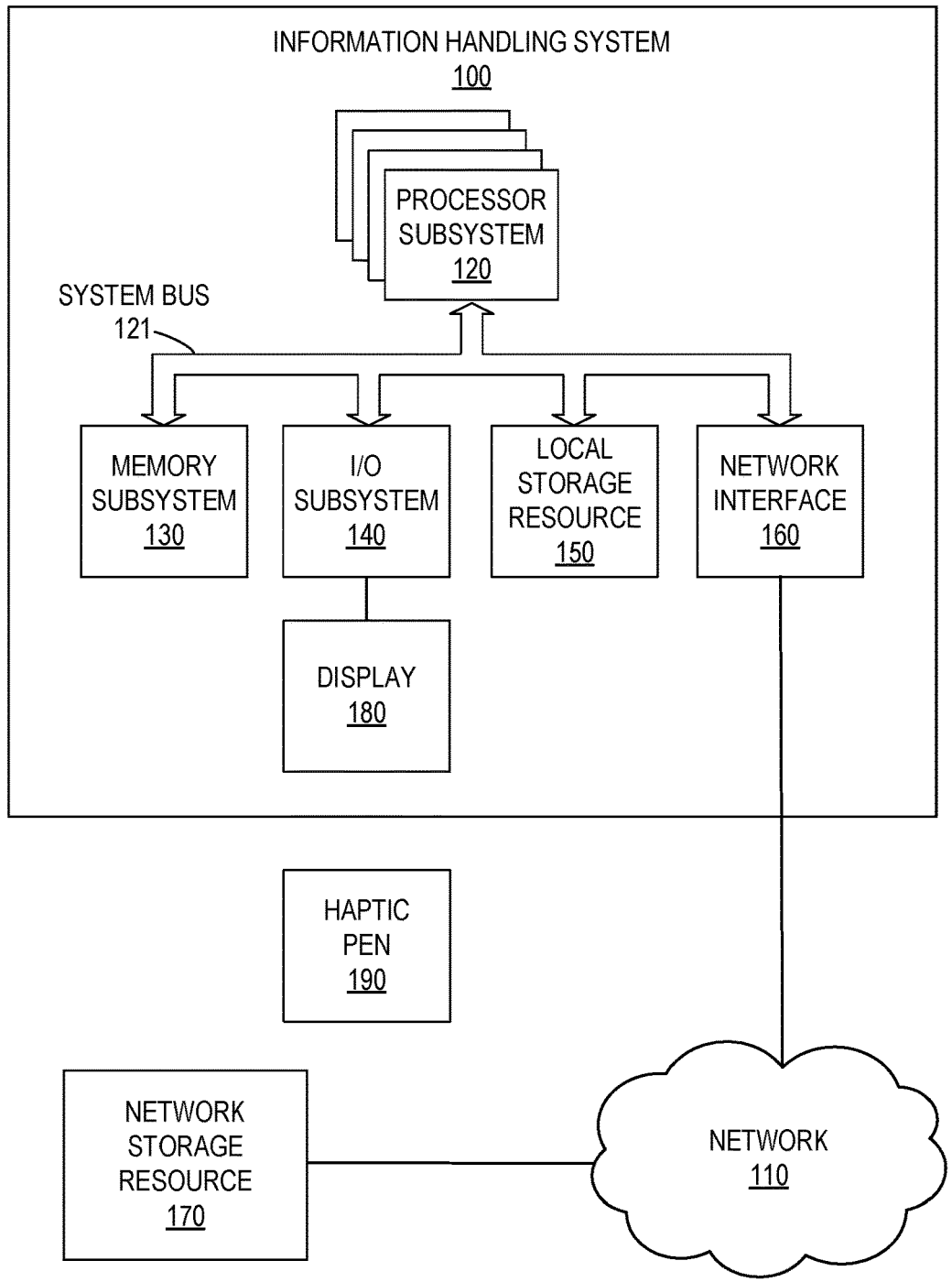
FIG. 1 is a block diagram of selected elements of an embodiment of an information handling system that includes a display and a haptic pen.

This document describes a method for emulating a plurality of writing devices using a haptic pen for an information handling system that may include: receiving, by a first microcontroller unit of the haptic pen, a device configuration indicating at least one writing device of the plurality of writing devices to be emulated; causing, by the first microcontroller unit, one or more transmitters of the haptic pen to transmit a beacon to a second microcontroller unit of a display of the information handling system; receiving, by the first microcontroller unit, one or more contextual inputs from a second microcontroller of the display of information handling system, the one or more contextual inputs indicating an orientation of the haptic pen in relation to a display of the information handling system; applying, by the first microcontroller unit, a respective weight to each of the one or more contextual inputs based on the device configuration; and causing, by the first microcontroller unit, a haptic response based on the respective weight applied to each of the one or more contextual inputs, the haptic response causing the haptic pen to emulate the at least one writing device of the plurality of writing devices.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140 communicatively coupled to a display 180, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

In information handling system 100, display 180 may comprise a system, device, or apparatus generally operable to receive information from a user and to display information processed by information handling system 100 via a screen. In particular, display 180 may be or include an I/O device comprised of circuitry configured to receive and display information, a casing to house the circuitry, and a power supply. In one embodiment, display 180 may be or include a screen configured to receive information from a user via haptic pen 190. Specifically, display 180 may detect a position of a tip of haptic pen 190 in relation to the screen and display information to a user based on the detected position. In one embodiment, display 180 may be or include a surface capacitive touchscreen configured to receive user input via touch and/or stylus (e.g., haptic pen 190). In other embodiments, display 180 may be or include a resistive touchscreen, a projected capacitive touchscreen, a surface acoustic wave (SAW) touchscreen, an infrared (IR) touchscreen, and/or any other type of screen suitable for receiving information from a user and displaying information processed by information handling system 100. Display 180 is described in further detail with respect to FIG. 2B.

In one embodiment, haptic pen 190 may comprise a system, device, or apparatus generally operable to emulate a plurality of writing devices. In particular, haptic pen 190 may be or include a pen-shaped I/O device configured to be held by a user and used as a pointing device to provide spatial data to information handling system 100 using physical gestures, for example, such as writing on a screen of display 180. In one embodiment, the user may provide input to display 180 via a tip of haptic pen 190 and receive haptic feedback, or a "haptic response," from haptic pen 190 based on the input provided by the user. Specifically, a user may select a writing device to emulate, or a "device configuration," from a plurality of writing devices (e.g., ballpoint pen, fountain pen, pencil, chalk, and the like), provide input to display 180 via haptic pen 190, and receive a haptic response from haptic pen 190 emulating the selected writing device. For example, a user may choose to emulate writing with a stick of chalk using haptic pen 190 by selecting a device configuration associated with chalk from a menu displayed to the user via display 180. In response to the user making the selection and providing input to the screen of display 180 via the tip of haptic pen 190, a haptic response caused by haptic pen 190 may emulate the tactile sensation of writing on a surface with chalk as the user provides input to the screen.

In one embodiment, haptic pen 190 may additionally emulate a plurality of textured items. In particular, a user may select a textured item to emulate, or a "texture configuration," upon which to write from a plurality of textured items (e.g., notebook paper, construction paper, concrete, brick, and the like). The user may provide input to display 180 via haptic pen 190 and receive a haptic response from haptic pen 190 emulating the selected textured item. For example, a user may choose to emulate writing on a brick surface using haptic pen 190 by selecting a texture configuration associated with brick from a menu displayed to the user via display 180. In response to the user making the selection and providing input to the screen of display 180 via the tip of haptic pen 190, a haptic response caused by haptic pen 190 may emulate the tactile sensation of writing on a brick surface as the user provides input to the screen. In one embodiment, haptic pen 190 may be or include a digital stylus including circuitry configured to emulate a plurality of writing devices and textured items. In other embodiments, haptic pen 190 may be or include a virtual reality (VR) remote controller, augmented reality (AR) remote controller, and/or any other type of I/O device suitable for emulating a plurality of writing devices and textured items. Haptic pen 190 is described in further detail with respect to FIG. 2A.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, T1, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2A:
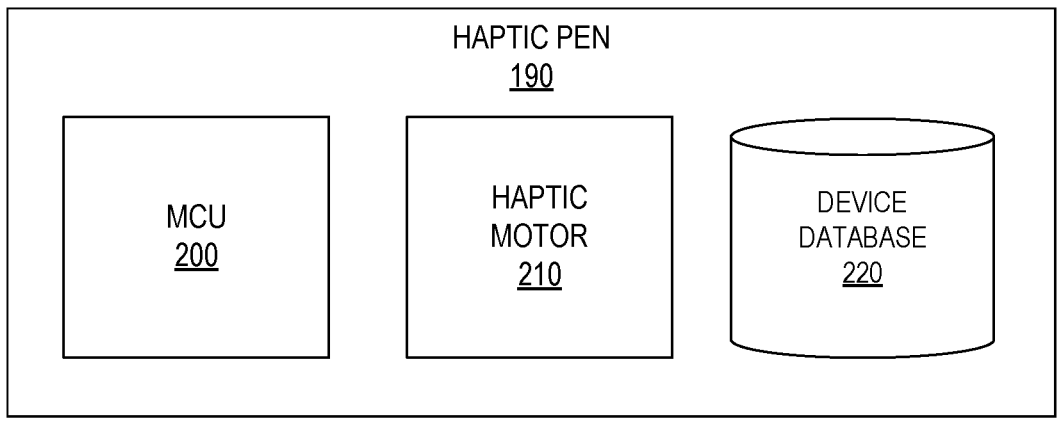
FIG. 2A is a block diagram of selected elements of an embodiment of a haptic pen for an information handling system.

FIG. 2A is a block diagram of selected elements of an embodiment of a haptic pen for an information handling system. In one embodiment, a user may provide input to display 180 via a tip of haptic pen 190 and receive a haptic response from haptic pen 190 based on the input provided by the user. Specifically, a user may select a device configuration (i.e., indicating a writing device to emulate) from a plurality of writing devices (e.g., ballpoint pen, fountain pen, pencil, chalk, and the like), provide input to display 180 via haptic pen 190, and receive a haptic response from haptic pen 190 emulating the selected writing device. Additionally, a user may select a texture configuration (i.e., a textured item to emulate) from a plurality of textured items (e.g., notebook paper, construction paper, concrete, brick, and the like), provide input to display 180 via haptic pen 190, and receive a haptic response from haptic pen 190 emulating the selected textured item. In the embodiment illustrated in FIG. 2A, haptic pen 190 includes a microcontroller unit (MCU) 200, a haptic motor 210, and a device database 220. In other embodiments, haptic pen 190 may include additional, fewer, and/or any combination of components suitable for emulating a plurality of writing devices.

In one embodiment, MCU 200 may comprise a system, device, or apparatus generally operable to cause a haptic response emulating a writing device and/or textured item. In particular, MCU 200 may receive a device configuration from a user of haptic pen 190 indicating a writing device of a plurality of writing devices that the user has selected to emulate. In one embodiment, the user may select a device configuration from device database 220, for example, via a user interface of haptic pen 190 (not shown in figure). In another embodiment, the user may select a device configuration from a user interface of display 180. In addition, MCU 200 may receive a texture configuration from a user of haptic pen 190 indicating at least one textured item of a plurality of textured items that the user has selected to emulate. MCU 200 may cause a haptic response emulating the tactile sensation associated with using the selected writing device and/or textured item based, in part, on the received device configuration and/or the received texture configuration, respectively.

In one embodiment, MCU 200 may cause one or more transmitters (not shown in figure) of haptic pen 190 to transmit one or more beacons (e.g., via Bluetooth) to display 180 upon receiving the device configuration from the user. In another embodiment, MCU 200 may cause the one or more transmitters to transmit the one or more beacons to display 180 upon receiving the texture configuration from the user. Each beacon transmitted to display 180 from haptic pen 190 may be used by display 180 to determine one or more contextual inputs associated with haptic pen 190. Each contextual input may indicate an orientation of haptic pen 190 in relation to display 180 (e.g., tilt angle of haptic pen 190 in relation to display 180, barrel rotation of haptic pen 190 about an axis of haptic pen 190, velocity in which haptic pen 190 traverses a surface of display 180, and the like). For example, MCU 200 may receive contextual input from display 180 indicating a position of a tip of haptic pen 190 in relation to the surface of display 180.

In one embodiment, an orientation of haptic pen 190 may be tracked externally by one or more optic sensors disposed throughout computing system 195 and communicatively coupled to haptic pen 190 such that MCU 200 may determine one or more contextual inputs. In particular, MCU 200 may determine one or more contextual inputs indicating an orientation of haptic pen 190 in relation to a volumetric space (e.g., an office, classroom, conference room, and the like). Here, haptic pen 190 may be used to emulate the tactile sensations associated with various writing devices while a user writes on surfaces other than display 180. In one embodiment, a user may use haptic pen 190 on an indirect surface (e.g., a desk surface, table surface, floor surface, and the like) separate from where emulated writing is displayed (e.g., on display 180). In another embodiment, a user may use haptic pen 190 on a vertical surface (e.g., dry erase board, window, wall, and the like) such that haptic pen 190 may emulate the tactile sensations associated with various writing devices while the user writes on the vertical surface. In another embodiment, a user may use haptic pen 190 in an AR/VR environment such that haptic pen 190 provides the tactile sensations associated with various writing devices while emulated writing is displayed to the user in a virtual three-dimensional (3D) space. In one embodiment, haptic pen 190 may include one or more multi-axis inertial measurement units (IMUs) (e.g., accelerometers, gyroscopes, magnetometers, and the like) communicatively coupled to MCU 200 to measure one or more contextual inputs indicating an orientation of haptic pen 190 in relation to a volumetric space. In other embodiments, one or more contextual inputs may be determined using any suitable combination of methods described above to indicate an orientation of haptic pen 190.

In one embodiment, MCU 200 may apply a respective weight to each of the one or more contextual inputs based on a received device configuration. Specifically, MCU 200 may apply a weight to a contextual input based on the type of writing device a user has selected to emulate. Each respective weight may be applied such that a haptic response may cause haptic pen 190 to emulate the tactile sensations associated with using the selected writing device. For example, the tactile sensations associated with using a fountain pen may vary depending on a tilt angle with which a user writes with the fountain pen. That is, writing with the fountain pen oriented orthogonally in relation to a surface may feel different to a user than writing with the fountain pen oriented at an acute angle in relation to the surface. In contrast, writing with a ballpoint pen oriented orthogonally in relation to a surface may feel similar to a user than writing with the ballpoint pen oriented at an acute angle in relation to the surface. To account for these variances in tactile sensations associated with each of the plurality of writing devices to be emulated, MCU 200 may apply respective weights used to modify the haptic response associated with each writing device. Specifically, MCU 200 may cause a haptic response based on the respective weight applied to each of the one or more contextual inputs indicating an orientation of haptic pen 190 in relation to display 180. In one embodiment, each operation, or a subset thereof, performed by MCU 200 disclosed herein may alternatively be performed by processor subsystem 120 of information handling system 100. In another embodiment, each operation, or a subset thereof, performed by MCU 200 disclosed herein may alternatively be performed by MCU 230 of display 180.

In one embodiment, haptic motor 210 may comprise a system, device, or apparatus generally operable to generate a haptic response for a user of haptic pen 190. In particular, haptic motor 210 may convert a voltage supplied by MCU 200 into torque causing haptic pen 190 to vibrate to generate a haptic response according to the respective weight applied to each of the one or more contextual inputs by MCU 200. It is noted that although a single haptic motor 210 is illustrated in FIG. 2A, haptic pen 190 may include any number of haptic motors suitable for generating a haptic response for a user of haptic pen 190. In one embodiment, haptic motor 210 may be or include one or more eccentric rotating mass vibration (ERMV) motors. In other embodiments, haptic motor 210 may be or include one or more linear resonant actuators (LRAs), one or more piezo haptics sensors, and/or any combination of haptic motors suitable for generating a haptic response for a user of haptic pen 190.

In one embodiment, device database 220 may comprise a system, device, or apparatus generally operable to store one or more device configurations associated with writing devices to be emulated. Specifically, device database 220 may be comprised of one or more tables in which each device configuration is stored as an entry. Each device configuration stored in device database 220 may be comprised of one or more parameters associated with tactile sensations of a writing device to be emulated. Examples of parameters associated with tactile sensations of a writing device may include a frequency in which the writing device vibrates in response to writing on a surface, an amplitude of vibration in response to writing on a surface, a coefficient of friction associated with the interaction between a tip of the writing device and a surface, and the like. In one embodiment, device configurations stored in device database 220 may be accessed by MCU 200 in response to a user indicating a writing device to emulate, for example, by selecting a device configuration via a user interface of display 180. Here, MCU 200 may cause haptic motor 210 to vibrate in accordance with the one or more parameters associated with the selected device configuration. In another embodiment, the user may access device database 220 to select a device configuration, for example, via a user interface of haptic pen 190. In one embodiment, device database 220 may be or include a relational database in which each device configuration is stored as an entry. In other embodiments, device database 220 may be or include a centralized database, distributed database, commercial database, operational database, and/or any other database management system suitable for storing a plurality of device configurations.

Figure 2B:
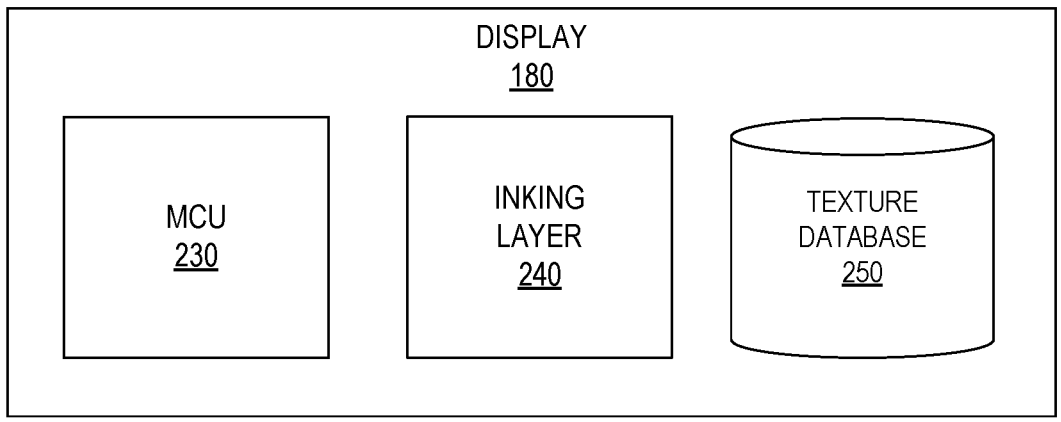
FIG. 2B is a block diagram of selected elements of an embodiment of a display of an information handling system.

FIG. 2B is a block diagram of selected elements of an embodiment of a display of an information handling system. In one embodiment, display 180 may be or include a screen configured to receive information from a user via haptic pen 190. Specifically, display 180 may detect a position of a tip of haptic pen 190 in relation to the screen and display information to a user based on the detected position. In the embodiment illustrated in FIG. 2B, display 180 may include a microcontroller unit (MCU) 230, an inking layer 240, and a texture database 250. In other embodiments, display 180 may include additional, fewer, and/or any combination of components suitable for receiving information from a user and displaying information processed by information handling system 100 via a screen.

In one embodiment, MCU 230 may comprise a system, device, or apparatus generally operable to determine one or more contextual inputs for haptic pen 190. In particular, MCU 230 may determine one or more contextual inputs indicating an orientation of haptic pen 190 in relation to display 180 based on a beacon transmitted from each transmitter of haptic pen 190. The one or more contextual inputs may be used by MCU 200, in part, to cause a haptic response that emulates the tactile sensations associated with using a given writing device selected by a user. Examples of contextual input determined by MCU 230 may include a tilt angle of haptic pen 190 in relation to display 180, a barrel rotation of haptic pen 190 about an axis of haptic pen 190, a velocity in which haptic pen 190 traverses a surface of display 180, and the like. In addition, MCU 230 may cause inking layer 240 to display a digital representation of the writing style associated with the writing device a user has selected to emulate. In particular, MCU 230 may provide the device configuration selected by a user and each determined contextual input to inking layer 240 of display 180 such that inking layer 240 may display a digital representation emulating a writing style of the selected writing device (i.e., as indicated by the device configuration selected by the user). In one embodiment, each operation, or a subset thereof, performed by MCU 230 disclosed herein may alternatively be performed by processor subsystem 120 of information handling system 100. In another embodiment, each operation, or a subset thereof, performed by MCU 230 disclosed herein may alternatively be performed by MCU 200 of haptic pen 190. MCU 230 is discussed in further detail with respect to FIG. 3.

In one embodiment, inking layer 240 may comprise a system, device, or apparatus generally operable to display a digital representation of the writing style associated with at least one writing device a user has selected to emulate. In particular, inking layer 240 may receive a device configuration selected by a user and each contextual input determined by MCU 230 such that inking layer 240 may emulate a writing style of the writing device indicated in the selected device configuration. In one embodiment, inking layer 240 may be comprised of software that receives the device configuration and each contextual input determined by MCU 230 as inputs. Inking layer 240 may use the received device configuration to emulate the writing style of the writing device (e.g., on a screen of display 180) in response to the user providing input to display 180 via haptic pen 190. For example, if a user has selected to emulate a fountain pen and provides input to display 180 via a tip of haptic pen 190, inking layer 240 may display a digital representation of the writing style associated with the fountain pen, such as one or more thin lines of ink, on a screen of display 180. Inking layer 240 may additionally use each received contextual input determined by MCU 230 to modify the emulated writing style of the writing device. For example, if the user decreases a tilt angle of haptic pen 190 in relation to display 180 while emulating the fountain pen, inking layer 240 may display one or more thicker lines of ink to further emulate the writing style associated with the fountain pen. Inking layer 240 is described in further detail with respect to FIG. 3.

In one embodiment, texture database 250 may comprise a system, device, or apparatus generally operable to store one or more texture configurations associated with textured items to be emulated. In particular, texture database 250 may be comprised of one or more tables in which each texture configuration is stored as an entry. Each texture configuration stored in texture database 250 may be comprised of one or more parameters associated with tactile sensations of a textured item to be emulated. Examples of parameters associated with tactile sensations of a textured item may include a frequency in which the textured item causes a writing device to vibrate in response to receiving writing from the writing device, an amplitude of the vibration caused by the textured item in response to receiving writing from the writing device, a coefficient of friction associated with the interaction between a surface of the textured item and a tip of the writing device, and the like. For example, a textured item such paper may be associated with a high frequency and a low amplitude while a textured item such as brick may be associated with a low frequency and a high amplitude. In one embodiment, texture configurations stored in texture database 250 may be accessed by MCU 200 of haptic pen 190 in response to a user indicating a textured item to emulate, for example, by selecting a texture configuration via a user interface of display 180. Here, MCU 200 may cause haptic motor 210 to vibrate in accordance with the one or more parameters associated with the selected texture configuration. In another embodiment, texture configurations stored in texture database 250 may be accessed by MCU 230 of display 180 and provided to inking layer 240 such that inking layer 240 may display a digital representation of a selected texture configuration. In yet another embodiment, a user may access texture database 250 to select a texture configuration, for example, via a user interface of inking layer 240. In one embodiment, texture database 250 may be or include a relational database in which each texture configuration is stored as an entry. In other embodiments, texture database 250 may be or include a centralized database, distributed database, commercial database, operational database, or any other database management system suitable for storing one or more texture configurations associated with textured items to be emulated.

Figure 3:
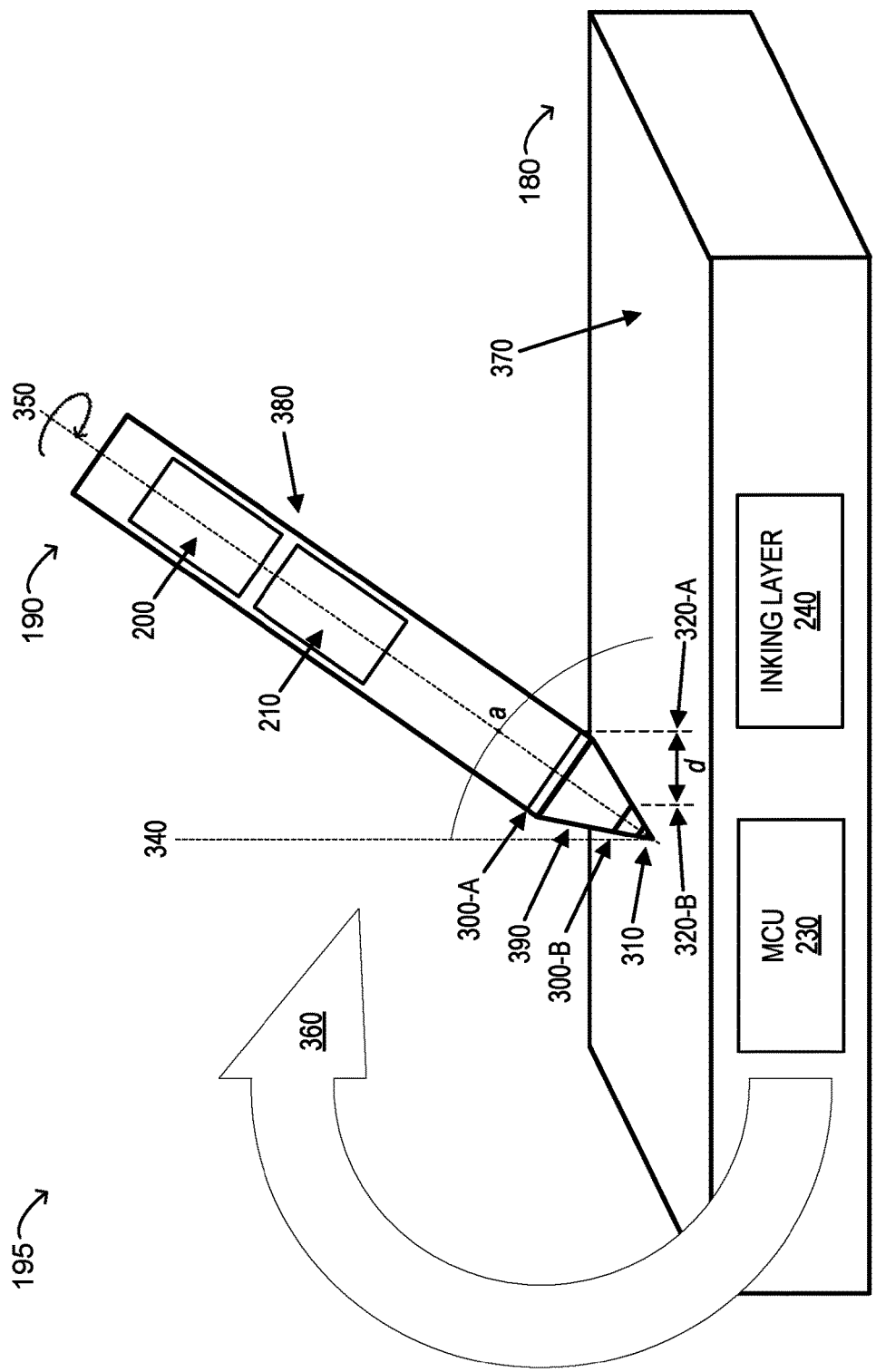
FIG. 3 is a block diagram of selected elements of an embodiment of a haptic pen and a display.

FIG. 3 is a block diagram of selected elements of an embodiment of a computing system 195 that includes a haptic pen and a display. In the embodiment illustrated in FIG. 3, haptic pen 190 may include MCU 200, haptic motor 210, transmitters 300A and 300 B (collectively referred to herein as "transmitters 300"), beacons 320-A and 320-B (collectively referred to herein as "beacons 320"), pressure sensor 310, barrel 380, and tip 390. Display 180 may include MCU 230, inking layer 240, and surface 370. It is noted that although selected elements of haptic pen 190 and display 180 are illustrated in FIG. 3, haptic pen 190 and display 180 may include each of the elements described with respect to FIGS. 2A and 2B. In addition, each of the elements illustrated in FIG. 3 may be configured to operate similarly to the embodiments described above with respect to FIGS. 2A and 2B. In other embodiments, haptic pen 190 and display 180 may include additional, fewer, and/or any combination of components suitable for emulating a plurality of writing devices and textured items.

In one embodiment, transmitters 300 may be or include one or more wireless transmitters (e.g., Bluetooth transmitters) disposed on haptic pen 190 configured to transmit a beacon to display 180. In the embodiment illustrated in FIG. 3, haptic pen 190 includes transmitters 300-A and 300-B disposed proximate to a base of barrel 380 and a base of tip 390, respectively. As shown in FIG. 3, transmitter 300-A may transmit beacon 320-A and transmitter 300-B may transmit beacon 320-B. Here, beacons 320-A and 320-B may be or include radio signals comprised of different respective frequencies. MCU 200 of haptic pen 190 may cause transmitters 300 to each transmit their respective beacons to display 180 such that MCU 230 may determine one or more contextual inputs indicating an orientation of haptic pen 190 in relation to display 180 (e.g., tilt angle of haptic pen 190 in relation to display 180, barrel rotation of haptic pen 190 about an axis of haptic pen 190, velocity in which haptic pen 190 traverses a surface of display 180, and the like). In one embodiment, transmitters 300 may transmit beacons 320 to MCU 230 of display 180. In another embodiment, transmitters 300 may transmit beacons 320 to surface 370 of display 180 where beacons 320 may be captured by one or more sensors (not shown in figure) of MCU 230.

In one embodiment, each beacon 320 transmitted by transmitters 300 may be processed by MCU 230 to determine one or more contextual inputs for haptic pen 190. In particular, MCU 230 may determine an orientation of haptic pen 190 in relation to display 180 by identifying a location of each beacon in relation to other beacons. In the embodiment illustrated in FIG. 3, MCU 230 may identify a distance d between beacons 320-A and 320-B and use the distance d to triangulate an orientation of transmitters 300-A and 300-B in relation to one another. MCU 230 may use the orientation of transmitters 300-A and 300-B to determine a tilt angle a of haptic pen 190 in relation to vertical axis 340 as shown in FIG. 3. In addition, MCU 230 may use the orientation of transmitters 300-A and 300-B to determine a barrel rotation of barrel 380 about axis 350. MCU may additionally identify a distance in which a given beacon has traversed surface 370 with respect to a given time period to determine a velocity of haptic pen 190. Similarly, MCU 230 may determine a position of haptic pen 190 in relation to surface 370 by identifying a location of a beacon in relation to surface 370. However, a contextual input indicating a pressure applied to haptic pen 190 by a user may be determined by MCU 200 based on a pressure detected by pressure sensor 310. In the embodiment illustrated in FIG. 3, pressure sensor 310 may be disposed at, or proximate to, the base of tip 390, where pressure sensor 310 may detect a pressure with which the user is using haptic pen 190 to emulate a writing device and/or textured item.

In response to determining one or more contextual inputs indicating an orientation of haptic pen 190 in relation to display 180, MCU 230 may transmit the one or more contextual inputs to MCU 200 of haptic pen 190 via feedback loop 360 as illustrated in FIG. 3. MCU 200 may receive the one or more contextual inputs and apply a respective weight to each of the one or more contextual inputs based on the device configuration (i.e., writing device) selected by a user. Each respective weight may be applied such that a haptic response generated by haptic motor 210 may cause haptic pen 190 to emulate the tactile sensations associated with the selected device configuration as haptic pen 190 changes orientation. In one embodiment, each respective weight may comprise a numerical value (e.g., 1 through 10) to be applied the contextual input to modify, or refrain from modifying, the one or more parameters associated with tactile sensations of a writing device to be emulated (e.g., stored in device database 220) based on an orientation of haptic pen 190. For example, respective weights may be applied to contextual input to modify a frequency in which the writing device vibrates in response to writing on a surface, an amplitude of vibration in response to writing on a surface, a coefficient of friction associated with a tip of the writing device, and the like. Similarly, respective weights may be applied to contextual input to refrain from modifying the frequency in which the writing device vibrates in response to writing on the surface, the amplitude of vibration in response to writing on the surface, the coefficient of friction associated with the tip of the writing device, and the like. In addition, MCU 230 may transmit the one or more contextual inputs to inking layer 240 of display 180 such that inking layer 240 may display a digital representation of the writing style associated with the writing device (e.g., on a screen of display 180) and modify the emulated writing style of the writing device based on the contextual inputs determined by MCU 230 as described with respect to FIG. 2B.

In one example, MCU 200 may apply respective weights to contextual inputs for a device configuration indicating a fountain pen to be emulated. Specifically, MCU 200 may apply a respective weight greater than 1 to each contextual input received from MCU 230 given that the tactile sensations associated with a fountain pen may change in response to changes in the orientation of the fountain pen. In this example, in response to receiving contextual input indicating that a tilt angle of haptic pen 190 is oriented along vertical axis 340 (i.e., orthogonal to surface 370), MCU 200 may apply a large respective weight (e.g., respective weight of 9) to contextual input associated with a tilt angle of haptic pen 190 to cause haptic motor 210 to increase vibrations that emulate an increased coefficient of friction. Here, the increased coefficient of friction may emulate the sharp tip of an actual fountain pen scraping across a surface as the fountain pen is oriented vertically. If MCU 230 determines that the tilt angle of haptic pen 190 has changed to a tilt angle a of 35° in relation to vertical axis 340, MCU 200 may apply a smaller respective weight (e.g., respective weight of 5) to contextual input associated with the tilt angle of haptic pen 190 to cause haptic motor 210 to decrease vibrations that emulate a decreased coefficient of friction. Here, the decreased coefficient of friction may emulate the tip of an actual fountain pen becoming level with the surface as ink from the fountain pen begins to flow more readily than while in the vertical orientation. Similarly, MCU 200 may apply a respective weight greater than 1 to contextual input associated with a barrel rotation of barrel 380 of haptic pen 190 to emulate ways in which tactile sensations change as a fountain pen rotates about its axis. MCU 200 may additionally apply a respective weight greater than 1 to contextual input associated with a velocity of haptic pen 190 to emulate changes in tactile sensations caused by increased and decreased velocities with which a user may write with the fountain pen.

In another example, MCU 200 may refrain from modifying the one or more parameters associated with tactile sensations of a ballpoint pen to be emulated. In particular, MCU 200 may apply a respective weight of 1 to each contextual input received from MCU 230 given that the tactile sensations associated with a ballpoint pen may not change significantly in response to changes in orientation of the ballpoint pen. In this example, in response to receiving contextual input indicating that a tilt angle of haptic pen 190 is oriented along vertical axis 340, MCU 200 may apply a respective weight of 1 to contextual input associated with a tilt angle of haptic pen 190 to cause haptic motor 210 to maintain vibrations that emulate a normalized coefficient of friction as indicated by the one or more parameters associated with tactile sensations of a ballpoint pen stored in device database 220. Here, the normalized coefficient of friction may emulate the tip of an actual ballpoint pen traversing across a surface as the ballpoint pen is oriented vertically. If MCU 230 determines that the tilt angle of haptic pen 190 has changed to a tilt angle a of 40° in relation to vertical axis 340, MCU 200 may apply the same respective weight of 1 to contextual input associated with the tilt angle of haptic pen 190 to cause haptic motor 210 to maintain the vibrations that emulate the normalized coefficient of friction. Here, because the coefficient of friction associated with the actual ballpoint pen is independent of tilt angle in relation to the surface, MCU 200 may apply the same respective weight of 1 to contextual input associated with the tilt angle of haptic pen 190 regardless of changes in the tilt angle. Similarly, MCU 200 may apply a respective weight of 1 to contextual input associated with a barrel rotation of barrel 380 of haptic pen 190 to emulate ways in which tactile sensations may remain constant as a ballpoint pen rotates about its axis. MCU 200 may additionally apply a respective weight of 1 to contextual input associated with a velocity of haptic pen 190 to emulate ways in which tactile sensations may remain constant as a ballpoint pen increases and decreases in velocity while traversing a surface.

In one embodiment, MCU 200 may additionally apply a respective weight to each of the one or more contextual inputs based on the texture configuration (i.e., textured item) selected by a user. Each respective weight may be applied such that a haptic response generated by haptic motor 210 may cause haptic pen 190 to emulate the tactile sensations associated with the selected texture configuration as haptic pen 190 changes velocity. For example, respective weights may be applied to contextual input to modify a frequency in which the writing device vibrates in response to writing a particular textured item, the amplitude of vibration in response to writing on the textured item, the coefficient of friction associated with the textured item, and the like. For example, MCU 200 may apply a large respective weight (e.g., respective weight of 9) to contextual input to cause haptic motor 210 to increase vibrations that emulate a writing device writing on a brick surface with a significant velocity, such as 13 words per minute. However, MCU 200 may apply a smaller respective weight (e.g., respective weight of 5) to contextual input associated with the velocity of haptic pen 190 to cause haptic motor 210 to decrease vibrations that emulate the writing device writing on the brick surface with a reduced velocity, such as 5 words per minute. In another example, MCU 200 may apply a normalized respective weight (e.g., respective weight of 1) to contextual input to cause haptic motor 210 to maintain vibrations that emulate a writing device writing on a glass surface. Here, because tactile sensations may remain constant as a writing device increases and decreases in velocity while traversing a glass surface, a normalized respective weight may be applied by MCU 200 regardless of changes in velocity of haptic pen 190. In one embodiment, MCU 200 may apply respective weights to contextual input received from MCU 230 comprised of a combination of respective weights based on the device configuration (i.e., writing device) selected by a user and the texture configuration (i.e., textured items) selected by a user.

Figure 4:
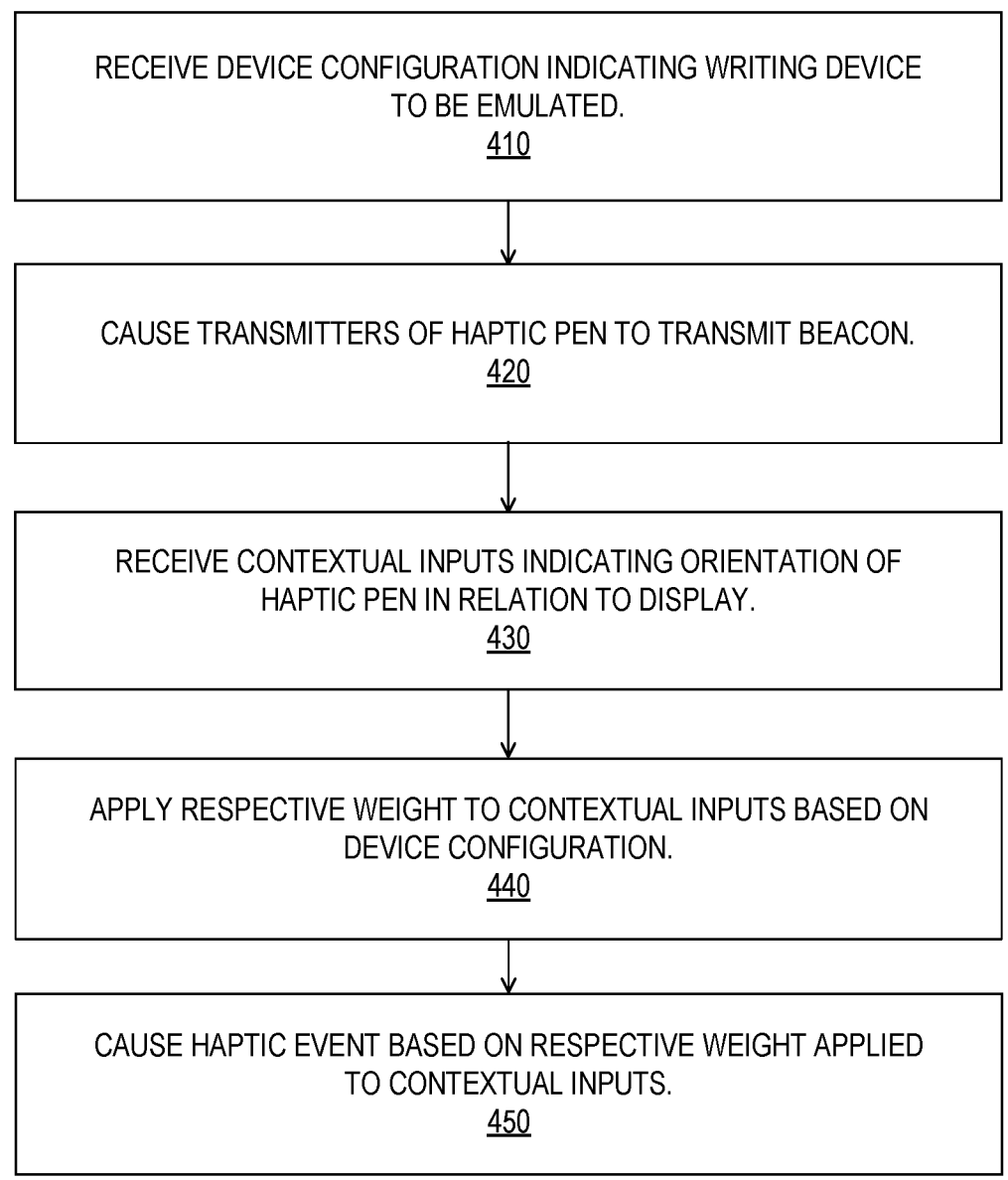
FIG. 4 is a flowchart depicting selected elements of an embodiment of a method for emulating a plurality of writing devices using a haptic pen for an information handling system.

FIG. 4 is a flowchart depicting selected elements of an embodiment of a method for emulating a plurality of writing devices using a haptic pen for an information handling system. It is noted that certain operations described in method 400 may be optional or may be rearranged in different embodiments.

Method 400 may begin at step 410, where MCU 200 may receive a device configuration from a user of haptic pen 190. The device configuration may indicate at least one writing device selected by the user of a plurality of writing devices to be emulated. In step 420, MCU 200 may cause transmitters 300 of haptic pen 190 to each transmit a beacon to MCU 230 of display 180. In step 430, MCU 200 may receive one or more contextual inputs from MCU 230 of display 180. The one or more contextual inputs received by MCU 200 may indicate an orientation of haptic pen 190 in relation to display 180. In step 440, MCU 200 may apply respective weights to each of the one or more contextual inputs received from MCU 230 based on the device configuration received from the user. In step 450, MCU 200 may cause a haptic response based on the respective weight applied to each of the one or more contextual inputs received from MCU 230. The haptic response caused by MCU 200 may cause haptic pen 190 to emulate the at least one writing device of the plurality of writing devices selected by the user.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for emulating a plurality of writing devices using a haptic pen for an information handling system, the method comprising:

receiving, by a first microcontroller unit of the haptic pen, a device configuration indicating at least one writing device of the plurality of writing devices to be emulated;

causing, by the first microcontroller unit, one or more transmitters of the haptic pen to transmit a beacon to a second microcontroller unit of a display of the information handling system;

receiving, by the first microcontroller unit, one or more contextual inputs from the second microcontroller unit, the one or more contextual inputs indicating an orientation of the haptic pen in relation to the display;

applying, by the first microcontroller unit, a respective weight to each of the one or more contextual inputs based on the device configuration; and causing, by the first microcontroller unit, one or more haptic motors of the haptic pen to vibrate to cause a haptic response, the haptic response causing the haptic pen to emulate the at least one writing device of the plurality of writing devices, the respective weight applied to each of the one or more contextual inputs to modify a frequency in which the one or more haptic motors vibrate.

2. The method of claim 1, wherein causing the haptic response based on the respective weight applied to each of the one or more contextual inputs further comprises:

causing, by the second microcontroller unit, an inking layer of the display of the information handling system to display a digital representation of writing associated with the at least one writing device, the digital representation emulating a writing style of the at least one writing device.

3. The method of claim 1, further comprising:

receiving, by the first microcontroller unit, a texture configuration indicating at least one textured item of a plurality of textured items to be emulated;

applying, by the first microcontroller unit, the respective weight to each of the one or more contextual inputs based on the texture configuration; and causing, by the first microcontroller unit, the haptic response based on the respective weight applied to each of the one or more contextual inputs, the haptic response causing the haptic pen to emulate the at least one textured item of the plurality of textured items.

4. The method of claim 1, further comprising:

determining, by the second microcontroller unit, the one or more contextual inputs based on the beacon, wherein the one or more contextual inputs include a tilt angle of the haptic pen in relation to a surface of the display; and transmitting, by the second microcontroller unit, the one or more contextual inputs to the first microcontroller unit of the haptic pen.

5. The method of claim 1, further comprising:

determining, by the second microcontroller unit, the one or more contextual inputs based on the beacon, wherein the one or more contextual inputs include a barrel rotation of the haptic pen about an axis of the haptic pen; and transmitting, by the second microcontroller unit, the one or more contextual inputs to the first microcontroller unit of the haptic pen.

6. The method of claim 1, further comprising:

determining, by the second microcontroller unit, the one or more contextual inputs based on the beacon, wherein the one or more contextual inputs include a velocity of the haptic pen; and transmitting, by the second microcontroller unit, the one or more contextual inputs to the first microcontroller unit of the haptic pen.

7. The method of claim 1, further comprising:
determining, by the second microcontroller unit, the one or more contextual inputs based on the beacon, wherein the one or more contextual inputs include a position of the haptic pen in relation to a surface of the display; and
transmitting, by the second microcontroller unit, the one or more contextual inputs to the first microcontroller unit of the haptic pen.

8. The method of claim 1, further comprising:
determining, by the first microcontroller unit, the one or more contextual inputs based on a pressure sensor of the haptic pen, wherein the one or more contextual inputs include a pressure with which a user is using the haptic pen, the pressure sensor disposed proximate to a tip of the haptic pen.

9. A haptic pen for an information handling system, the haptic pen comprising:
one or more transmitters;
one or more haptic motors;
a first microcontroller unit configured to:
receive a device configuration indicating at least one writing device of a plurality of writing devices to be emulated;
cause the one or more transmitters of the haptic pen to transmit a beacon to a second microcontroller unit of a display of the information handling system;
receive one or more contextual inputs from the second microcontroller unit, the one or more contextual inputs indicating an orientation of the haptic pen in relation to the display;
apply a respective weight to each of the one or more contextual inputs based on the device configuration; and
cause one or more haptic motors of the haptic pen to vibrate to cause a haptic response, the haptic response causing the haptic pen to emulate the at least one writing device of the plurality of writing devices, the respective weight applied to each of the one or more contextual inputs to modify a frequency in which the one or more haptic motors vibrate.

10. The haptic pen of claim 9, wherein the first microcontroller unit is further configured to:
receive a texture configuration indicating at least one textured item of a plurality of textured items to be emulated;
apply the respective weight to each of the one or more contextual inputs based on the texture configuration; and
cause the haptic response based on the respective weight applied to each of the one or more contextual inputs, the haptic response causing the haptic pen to emulate the at least one textured item of the plurality of textured items.

11. The haptic pen of claim 9, wherein the first microcontroller unit is further configured to:
determine the one or more contextual inputs based on a pressure sensor of the haptic pen, wherein the one or more contextual inputs include a pressure with which a user is using the haptic pen, the pressure sensor disposed proximate to a tip of the haptic pen.

12. A computing system, comprising:
a haptic pen including;
one or more transmitters;
one or more haptic motors; and
a first microcontroller unit;
an information handling system including:
a display; and
a second microcontroller unit;
the first microcontroller unit configured to:
receive a device configuration indicating at least one writing device of a plurality of writing devices to be emulated;
cause the one or more transmitters of the haptic pen to transmit a beacon to the second microcontroller unit of the display of the information handling system;
receive one or more contextual inputs from the second microcontroller unit, the one or more contextual inputs indicating an orientation of the haptic pen in relation to the display;
apply a respective weight to each of the one or more contextual inputs based on the device configuration; and
cause the one or more haptic motors of the haptic pen to vibrate to cause a haptic response, the haptic response causing the haptic pen to emulate the at least one writing device of the plurality of writing devices, the respective weight applied to each of the one or more contextual inputs to modify a frequency in which the one or more haptic motors vibrate.

13. The computing system of claim 12, wherein to cause the haptic response based on the respective weight applied to each of the one or more contextual inputs, the second microcontroller unit is further configured to:
cause an inking layer of the display of the information handling system to display a digital representation of writing associated with the at least one writing device, the digital representation emulating a writing style of the at least one writing device.

14. The computing system of claim 12, wherein the first microcontroller unit is further configured to:
receive a texture configuration indicating at least one textured item of a plurality of textured items to be emulated;
apply the respective weight to each of the one or more contextual inputs based on the texture configuration; and
cause the haptic response based on the respective weight applied to each of the one or more contextual inputs, the haptic response causing the haptic pen to emulate the at least one textured item of the plurality of textured items.

15. The computing system of claim 12, wherein the second microcontroller unit is further configured to:
determine the one or more contextual inputs based on the beacon, wherein the one or more contextual inputs include a tilt angle of the haptic pen in relation to a surface of the display; and
transmit the one or more contextual inputs to the first microcontroller unit of the haptic pen.

16. The computing system of claim 12, wherein the second microcontroller unit is further configured to:
determine the one or more contextual inputs based on the beacon, wherein the one or more contextual inputs include a barrel rotation of the haptic pen about an axis of the haptic pen; and
transmit the one or more contextual inputs to the first microcontroller unit of the haptic pen.

17. The computing system of claim 12, wherein the second microcontroller unit is further configured to:

determine the one or more contextual inputs based on the beacon, wherein the one or more contextual inputs include a velocity of the haptic pen; and transmit the one or more contextual inputs to the first microcontroller unit of the haptic pen.

* * * * *